(12) United States Patent
Yang

(10) Patent No.: US 11,405,554 B2
(45) Date of Patent: Aug. 2, 2022

(54) CONTROL METHOD AND DEVICE FOR ELECTRONIC DEVICE, ELECTRONIC DEVICE, AND STORAGE MEDIUM

(71) Applicant: SZ DJI TECHNOLOGY CO., LTD., Shenzhen (CN)

(72) Inventor: Zengxiong Yang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/182,210

(22) Filed: Feb. 22, 2021

(65) Prior Publication Data
US 2021/0176398 A1 Jun. 10, 2021

Related U.S. Application Data

(63) Continuation of application No. PCT/CN2018/103048, filed on Aug. 29, 2018.

(51) Int. Cl.
| | |
|---|---|
| H04N 5/232 | (2006.01) |
| G01L 19/00 | (2006.01) |
| G01P 15/14 | (2013.01) |
| G01S 19/01 | (2010.01) |
| H04N 5/262 | (2006.01) |

(52) U.S. Cl.
CPC ......... *H04N 5/23267* (2013.01); *G01L 19/00* (2013.01); *G01P 15/14* (2013.01); *G01S 19/01* (2013.01); *H04N 5/23254* (2013.01); *H04N 5/23258* (2013.01); *H04N 5/2628* (2013.01)

(58) Field of Classification Search
None
See application file for complete search history.

(56) References Cited

U.S. PATENT DOCUMENTS

| | | | | |
|---|---|---|---|---|
| 9,232,138 | B1* | 1/2016 | Baldwin | H04N 5/2328 |
| 9,756,249 | B1* | 9/2017 | Segapelli | H04N 5/23258 |
| 2011/0134259 | A1 | 6/2011 | Kim et al. | |
| 2012/0162454 | A1* | 6/2012 | Park | G06T 7/207 |
| | | | | 348/208.6 |
| 2016/0014341 | A1 | 1/2016 | Miyahara | |
| 2016/0360111 | A1 | 12/2016 | Thivent et al. | |
| 2019/0182428 | A1* | 6/2019 | Huang | H04N 5/23254 |

(Continued)

FOREIGN PATENT DOCUMENTS

| | | |
|---|---|---|
| CN | 1744673 A | 3/2006 |
| CN | 101656829 A | 2/2010 |

(Continued)

OTHER PUBLICATIONS

Shanshan Wei, et al., "Digital Video Stabilization Techniques: A Survey", Journal of Computer Research and Development, 54 (9): 2044-2054, 2017.

(Continued)

*Primary Examiner* — James M Hannett
(74) *Attorney, Agent, or Firm* — Anova Law Group, PLLC

(57) ABSTRACT

A control device includes a processor and a memory storing instructions that, when executed by the processor, cause the processor to obtain state information of an electronic device through one or more sensors of the electronic device and control an electronic image stabilization (EIS) function of the electronic device to be in an off state or an on state based on the state information.

18 Claims, 12 Drawing Sheets

(56) References Cited

U.S. PATENT DOCUMENTS

2019/0208120 A1* 7/2019 Huang ................ B64C 39/024
2019/0215451 A1* 7/2019 Enke ................ H04N 5/23245

FOREIGN PATENT DOCUMENTS

| | | |
|---|---|---|
| CN | 101729665 A | 6/2010 |
| CN | 102377941 A | 3/2012 |
| CN | 101729665 B | 10/2013 |
| CN | 104104856 A | 10/2014 |
| CN | 104780312 A | 7/2015 |
| CN | 105872376 A | 8/2016 |
| CN | 107105172 A | 8/2017 |
| CN | 107615159 A | 1/2018 |
| JP | 2003134385 A | 5/2003 |
| WO | 2013167037 A2 | 11/2013 |
| WO | WO-2016190994 A1 * 12/2016 | ........... G05D 1/0094 |

OTHER PUBLICATIONS

The World Intellectual Property Organization (WIPO) International Search Report for PCT/CN2018/103048 dated May 29, 2019 6 Pages (including translation).

* cited by examiner

CONTROL METHOD AND DEVICE FOR ELECTRONIC DEVICE, ELECTRONIC DEVICE, AND STORAGE MEDIUM

CROSS-REFERENCE TO RELATED APPLICATION

This application is a continuation of International Application No. PCT/CN2018/103048, filed on Aug. 29, 2018, the entire content of which is incorporated herein by reference.

TECHNICAL FIELD

The present disclosure relates to the technical field of electronic devices and, more specifically, to a control method and device for an electronic device, an electronic device, and a storage medium.

BACKGROUND

There are many sport scenes that require sports cameras or sports camcorders for shooting. For example, in scenes such as cycling, parachuting, skiing, surfing, and walking, the sports camera or the sports camcorder is not shooting statically, instead, it can move with the user to achieve sports shooting. The video images captured in these scenes tend to be blurry or jittering.

For the problems of blurriness and jittering of the video images, solutions in conventional technologies include optical image stabilization, mechanical image stabilization, and electronic image stabilization. The optical image stabilization is to include corresponding lens, and adjust the position of the lens to reduce the blur and jitter of the video images. The mechanical image stabilization refers to mounting a sports camera or a sports camcorder at a gimbal, and the gimbal is used to reduce the blur and jitter of the video images. Electronic image stabilization (EIS) refers to the use of a fixed algorithm to determine a cropping ratio of the video image. The cropping ratio has a fixed value. The video image is cropped based on the cropping ratio to reduce the blur and jitter of the video image.

When the user needs to turn on the EIS function, the user needs to manually click a button on a screen. However, in sport scenes, sports cameras and sports camcorders are generally required to quickly enter the EIS function. The manual operation reduces the efficiency of the EIS function switching.

SUMMARY

In accordance with the disclosure, there is provided a control device including a processor and a memory storing instructions that, when executed by the processor, cause the processor to obtain state information of an electronic device through one or more sensors of the electronic device and control an electronic image stabilization (EIS) function of the electronic device to be in an off state or an on state based on the state information.

Also in accordance with the disclosure, there is provided an electronic device including one or more sensors, a processor, and a memory storing instructions that, when being executed by the processor, cause the processor to obtain state information of the electronic device through the one or more sensors and control an electronic image stabilization (EIS) function of the electronic device to be in an off state or an on state based on the state information.

Also in accordance with the disclosure, there is provided a control method including obtaining state information of an electronic device through one or more sensors of the electronic device and controlling an electronic image stabilization (EIS) function of the electronic device to be in an off state or an on state based on the state information.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION OF THE EMBODIMENTS

In order to make the objectives, technical solutions, and advantages of the present disclosure more clear, the technical solutions in the embodiments of the present disclosure will be described below with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

As described above, when the user needs to turn on the EIS function, the user needs to manually click a button on a screen. However, in sport scenes, sports cameras and sports camcorders are generally required to quickly enter the EIS function. The manual operation reduces the efficiency of the EIS function switching. Embodiments of the present disclosure provide a control method and device for an electronic device, an electronic device, and a storage medium that solve the problems in the conventional technology.

Figure 1:
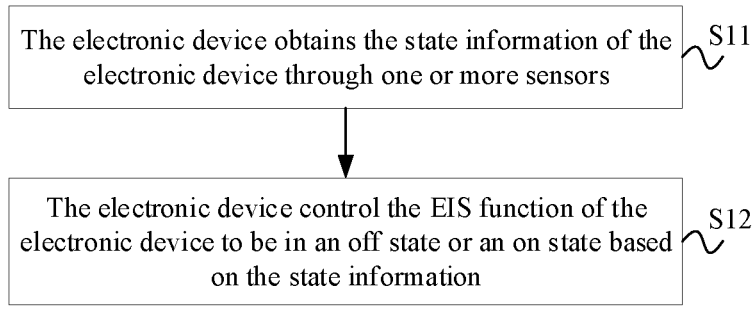
FIG. 1 is a flowchart of a method for controlling an electronic device according to an embodiment of the present disclosure.

FIG. 1 is a flowchart of a method for controlling an electronic device according to an embodiment of the present disclosure. The execution body of the method can be a part of the electronic device, such as the processor of the electronic device, or the entire electronic device. The electronic device can be a motion camera or a sports camera, as long as the electronic device has an imaging function, which is not limited in the embodiments of the present disclosure. In the following, the control method will be described by taking the electronic device as the execution body as an example. The method for controlling the electronic device will be described in detail below.

S11, the electronic device obtains state information of the electronic device through one or more sensors.

S12, the electronic device control an EIS function of the electronic device to be in an on state or an off state based on the state information.

In some embodiments, the one or more sensors may include one or more of a gyroscope sensor, a barometer sensor, a global positioning system (GSP) sensor, and an image sensor.

The gyroscope sensor can be used to measure acceleration information of the electronic device. The barometer sensor can be used to measure air pressure to obtain height information of the electronic device. The GPS sensor can be used to obtain GPS information of the electronic device. The image sensor can be used to obtain video information of the electronic device. The video information may be a frame of image, a video captured by the electronic device or a certain frame of image in the video, or the video information may be one or more pixels in a certain frame of image.

In some embodiments, the state information may include one or more of the acceleration information of the electronic device measured by the gyroscope, the height information of the electronic device sensed by the barometer, the GPS information of the electronic device obtained by the GPS sensor, and the video information of the electronic device obtained by the image sensor.

The electronic device may be in a dynamic scene or a static scene based on the state information, where the dynamic scene may include a constant-speed scene or a varying-speed scene. In some embodiments, if the electronic device is in a motion state of constant speed, the scene may be referred to as a constant-speed scene. If the electronic device is in a motion state of varying speed, the scene may be referred to as a varying-speed scene. If the electronic device is in a static state, the scene may be referred to as a static scene.

Further, when the electronic device is in a static scene or a constant-speed scene, the electronic device may control its EIS function to be in the off state. That is, if the current EIS function of the electronic device is in the off state, the electronic device does not need to change the current state of the EIS function. If the current EIS function of the electronic device is in the on state, the electronic device may control the current state of the EIS function to switch from the on state to the off state. If the electronic device is in the varying-speed scene, the electronic device may control its EIS function to be in the on state. That is, if the current EIS function of the electronic device is in the on state, the electronic device does not need to change the current state of the EIS function. If the current EIS function of the electronic device is in the off state, the electronic device may control the current state of the EIS function to switch from the off state to the on state.

An embodiment of the present disclosure provides a method for controlling an electronic device, which includes the electronic device obtaining the state information of the electronic device through one or more sensors. The electronic device can control the EIS function of the electronic device to be in an off state or an on state based on the state information. As such, whether the EIS function of the electronic device is turned on or off can be automatically controlled, thereby improving the efficiency of the switching of the EIS function.

The process at S12 will be described in detail below.

Figure 2A:
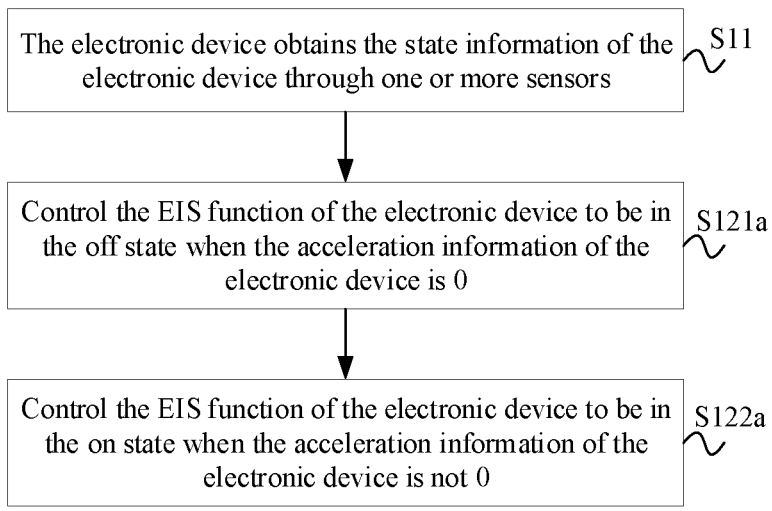
FIG. 2A is a flowchart of a method for controlling an electronic device according to another embodiment of the present disclosure.

FIG. 2A is a flowchart of a method for controlling an electronic device according to another embodiment of the present disclosure. The execution body of the method can be a part of the electronic device, such as the processor of the electronic device, or the entire electronic device. The electronic device can be a motion camera or a sports camera, as long as the electronic device has an imaging function, which is not limited in the embodiments of the present disclosure. In the following, the control method will be described by taking the electronic device as the execution body as an example. As shown in FIG. 2A, when the state information is the acceleration information of the electronic device, the process at S12 includes the following processes.

S121a, controlling the EIS function of the electronic device to be in the off state when the acceleration information of the electronic device is 0.

S122a, controlling the EIS function of the electronic device to be in the on state when the acceleration information of the electronic device is not 0.

More specifically, when the acceleration information of the electronic device is 0, it may indicate that the electronic device is in a static scene or a constant-speed scene. In this scenario, the EIS function of the electronic device can be controlled to be in the off state. That is, if the current EIS function of the electronic device is in the off state, the electronic device does not need to change the current state of the EIS function. If the current EIS function of the electronic device is in the on state, the electronic device may control the current state of the EIS function to switch from the on state to the off state.

When the acceleration information of the electronic device is not 0, it may indicate that the electronic device is in a varying-speed scene. In this scenario, the EIS function of the electronic device can be controlled to be in the on state. That is, if the current EIS function of the electronic device is in the on state, the electronic device does not need to change the current state of the EIS function. If the current EIS function of the electronic device is in the off state, the electronic device may control the current state of the EIS function to switch from the off state to the on state.

An embodiment of the present disclosure provides a method for controlling an electronic device, which includes the electronic device obtaining the acceleration information of the electronic device through the gyroscope sensor. When the acceleration information of the electronic device is 0, the EIS function of the electronic device can be controlled to be in the off state. When the acceleration information of the electronic device is not 0, the EIS function of the electronic device can be controlled to be in the on state. As such, whether the EIS function of the electronic device is turned on or off can be automatically controlled, thereby improving the efficiency of the switching of the EIS function.

Figure 2B:
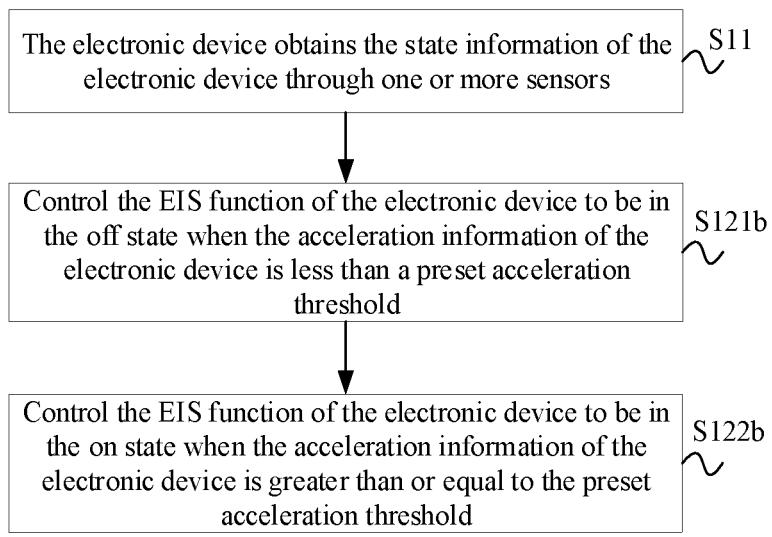
FIG. 2B is a flowchart of a method for controlling an electronic device according to another embodiment of the present disclosure.

FIG. 2B is a flowchart of a method for controlling an electronic device according to another embodiment of the present disclosure. The execution body of the method can be a part of the electronic device, such as the processor of the electronic device, or the entire electronic device. The electronic device can be a motion camera or a sports camera, as long as the electronic device has an imaging function, which is not limited in the embodiments of the present disclosure. In the following, the control method will be described by taking the electronic device as the execution body as an example. As shown in FIG. 2B, when the state information is the acceleration information of the electronic device, the process at S12 includes the following processes.

S121b, controlling the EIS function of the electronic device to be in the off state when the acceleration information of the electronic device is less than a preset acceleration threshold.

S122b, controlling the EIS function of the electronic device to be in the on state when the acceleration information of the electronic device is greater than or equal to the preset acceleration threshold.

In some embodiments, the preset acceleration threshold may be set based on actual conditions. For example, the preset acceleration threshold may be 1 m/s$^2$ or 2 m/s$^2$, which is not limited in the embodiments of the present disclosure.

When the acceleration information of the electronic device is less than the preset acceleration threshold, it may indicate that the electronic device is in a static scene or a constant-speed scene. In this scenario, the EIS function of the electronic device can be controlled to be in the off state. That is, if the current EIS function of the electronic device is in the off state, the electronic device does not need to change the current state of the EIS function. If the current EIS function of the electronic device is in the on state, the electronic device may control the current state of the EIS function to switch from the on state to the off state.

When the acceleration information of the electronic device is greater than or equal to the preset acceleration threshold, it may indicate that the electronic device is in a varying-speed scene. In this scenario, the EIS function of the electronic device can be controlled to be in the on state. That is, if the current EIS function of the electronic device is in the on state, the electronic device does not need to change the current state of the EIS function. If the current EIS function of the electronic device is in the off state, the electronic device may control the current state of the EIS function to switch from the off state to the on state.

An embodiment of the present disclosure provides a method for controlling an electronic device, which includes the electronic device obtaining the acceleration information of the electronic device through the gyroscope sensor. When the acceleration information of the electronic device is less than the preset acceleration threshold, the EIS function of the electronic device can be controlled to be in the off state. When the acceleration information of the electronic device is greater than or equal to the preset acceleration threshold, the EIS function of the electronic device can be controlled to be in the on state. As such, whether the EIS function of the electronic device is turned on or off can be automatically controlled, thereby improving the efficiency of the switching of the EIS function.

Figure 2C:
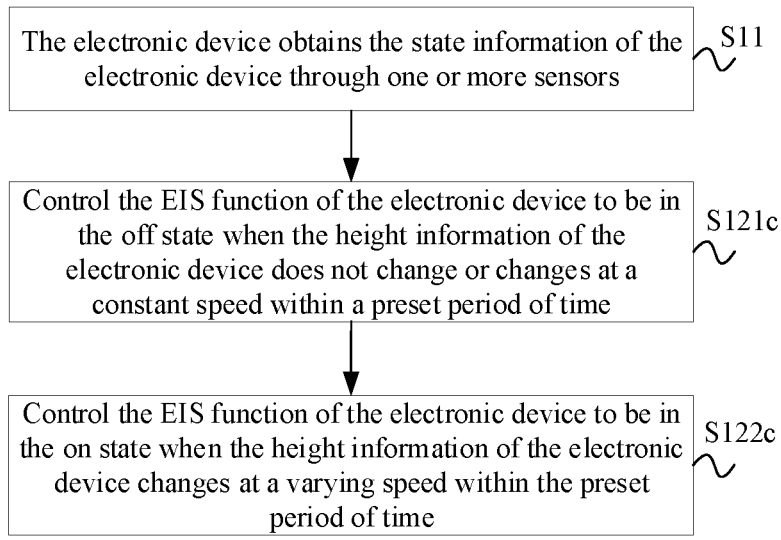
FIG. 2C is a flowchart of a method for controlling an electronic device according to another embodiment of the present disclosure.

FIG. 2C is a flowchart of a method for controlling an electronic device according to another embodiment of the present disclosure. The execution body of the method can be a part of the electronic device, such as the processor of the electronic device, or the entire electronic device. The electronic device can be a motion camera or a sports camera, as long as the electronic device has an imaging function, which is not limited in the embodiments of the present disclosure. In the following, the control method will be described by taking the electronic device as the execution body as an example. As shown in FIG. 2C, when the state information is the height information of the electronic device, the process at S12 includes the following processes.

S121c, controlling the EIS function of the electronic device to be in the off state when the height information of the electronic device does not change or changes at a constant speed within a preset period of time.

S122c, controlling the EIS function of the electronic device to be in the on state when the height information of the electronic device changes at a varying speed within the preset period of time.

More specifically, when the height information of the electronic device does not change with the preset period of time, it may indicate that the electronic device is in a static scene, and when the height information of the electronic device changes at a constant speed within the preset period of time, it may indicate that the electronic device is in a constant-speed scene. In this scenario, the EIS function of the electronic device can be controlled to be in the off state. That is, if the current EIS function of the electronic device is in the off state, the electronic device does not need to change the current state of the EIS function. If the current EIS function of the electronic device is in the on state, the electronic device may control the current state of the EIS function to switch from the on state to the off state.

When the height information of the electronic device changes at a varying speed within the preset period of time, it may indicate that the electronic device is in a varying-speed scene. In this scenario, the EIS function of the electronic device can be controlled to be in the on state. That is, if the current EIS function of the electronic device is in the on state, the electronic device does not need to change the current state of the EIS function. If the current EIS function of the electronic device is in the off state, the electronic device may control the current state of the EIS function to switch from the off state to the on state.

An embodiment of the present disclosure provides a method for controlling an electronic device, which includes the electronic device obtaining the height information of the electronic device through the barometer sensor. When the height information of the electronic device does not change or changes at a constant speed within the preset period of time, the EIS function of the electronic device can be controlled to be in the off state. When the height information of the electronic device changes at a varying speed within the preset period of time, the EIS function of the electronic device can be controlled to be in the on state. As such, whether the EIS function of the electronic device is turned on or off can be automatically controlled, thereby improving the efficiency of the switching of the EIS function.

Figure 2D:
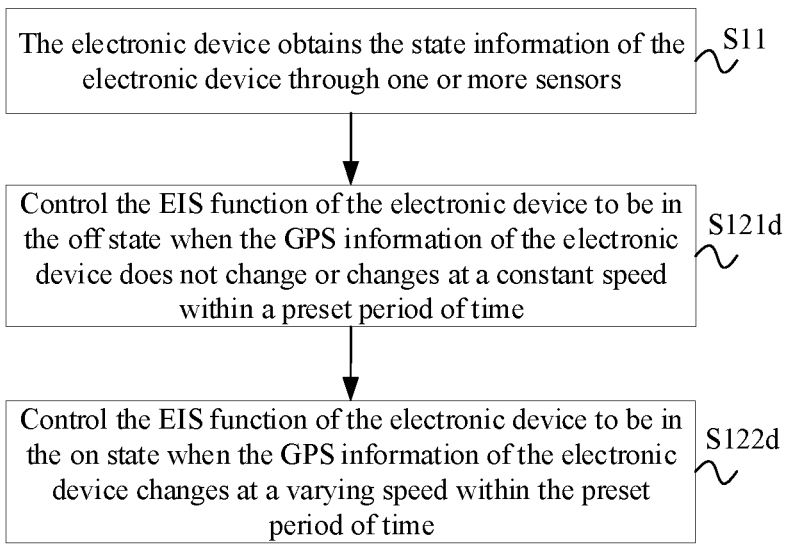
FIG. 2D is a flowchart of a method for controlling an electronic device according to another embodiment of the present disclosure.

FIG. 2D is a flowchart of a method for controlling an electronic device according to another embodiment of the present disclosure. The execution body of the method can be a part of the electronic device, such as the processor of the electronic device, or the entire electronic device. The electronic device can be a motion camera or a sports camera, as long as the electronic device has an imaging function, which is not limited in the embodiments of the present disclosure. In the following, the control method will be described by taking the electronic device as the execution body as an example. As shown in FIG. 2D, when the state information is the GPS information of the electronic device, the process at S12 includes the following processes.

S121d, controlling the EIS function of the electronic device to be in the off state when the GPS information of the electronic device does not change or changes at a constant rate within the preset period of time.

S122d, controlling the EIS function of the electronic device to be in the on state when the GPS information of the electronic device changes at a varying rate within the preset period of time.

More specifically, when the GPS information of the electronic device does not change with the preset period of time, it may indicate that the electronic device is in a static scene, and when the GPS information of the electronic device changes at a constant rate within the preset period of time, it may indicate that the electronic device is in a constant-speed scene. In this scenario, the EIS function of the electronic device can be controlled to be in the off state. That is, if the current EIS function of the electronic device is in the off state, the electronic device does not need to change the current state of the EIS function. If the current EIS function of the electronic device is in the on state, the electronic device may control the current state of the EIS function to switch from the on state to the off state.

When the GPS information of the electronic device changes at a varying rate within the preset period of time, it may indicate that the electronic device is in a varying-speed scene. In this scenario, the EIS function of the electronic device can be controlled to be in the on state. That is, if the current EIS function of the electronic device is in the on state, the electronic device does not need to change the current state of the EIS function. If the current EIS function of the electronic device is in the off state, the electronic device may control the current state of the EIS function to switch from the off state to the on state.

An embodiment of the present disclosure provides a method for controlling an electronic device, which includes the electronic device obtaining the GPS information of the electronic device through the GPS sensor. When the GPS information of the electronic device does not change or changes at a constant rate within the preset period of time, the EIS function of the electronic device can be controlled to be in the off state. When the GPS information of the electronic device changes at a varying rate within the preset period of time, the EIS function of the electronic device can be controlled to be in the on state. As such, whether the EIS function of the electronic device is turned on or off can be automatically controlled, thereby improving the efficiency of the switching of the EIS function.

Figure 2E:
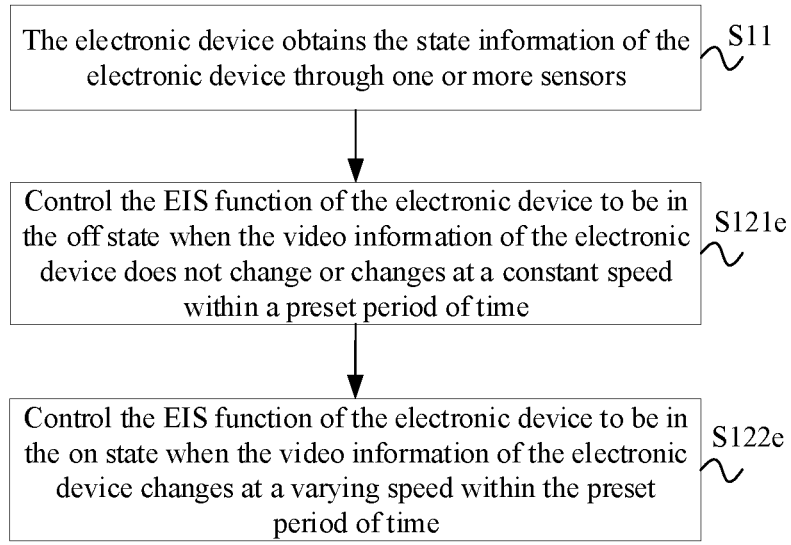
FIG. 2E is a flowchart of a method for controlling an electronic device according to another embodiment of the present disclosure.

FIG. 2E is a flowchart of a method for controlling an electronic device according to another embodiment of the present disclosure. The execution body of the method can be a part of the electronic device, such as the processor of the electronic device, or the entire electronic device. The electronic device can be a motion camera or a sports camera, as long as the electronic device has an imaging function, which is not limited in the embodiments of the present disclosure. In the following, the control method will be described by taking the electronic device as the execution body as an example. As shown in FIG. 2E, when the state information is the video information of the electronic device, the process at S12 includes the following processes.

S121e, controlling the EIS function of the electronic device to be in the off state when the video information of the electronic device does not change or changes at a constant rate within the preset period of time.

S122e, controlling the EIS function of the electronic device to be in the on state when the video information of the electronic device changes at a varying rate within the preset period of time.

As described above, the video information may be a video captured by the electronic device or a certain frame of image in the video, or the video information may be one or more pixels in a certain frame of image. Take the video information as a video of the electronic device as an example. When the video information of the electronic device does not change within the preset period of time, it may indicate that the electronic device is in a static scene, and when the video information of the electronic device changes at a constant rate within the preset period of time, it may indicate that the electronic device is in a constant-speed scene. In this scenario, the EIS function of the electronic device can be controlled to be in the off state. That is, if the current EIS function of the electronic device is in the off state, the electronic device does not need to change the current state of the EIS function. If the current EIS function of the electronic device is in the on state, the electronic device may control the current state of the EIS function to switch from the on state to the off state.

When the video information of the electronic device changes at a varying rate within the preset period of time, it may indicate that the electronic device is in a varying-speed scene. In this scenario, the EIS function of the electronic device can be controlled to be in the on state. That is, if the current EIS function of the electronic device is in the on state, the electronic device does not need to change the current state of the EIS function. If the current EIS function of the electronic device is in the off state, the electronic device may control the current state of the EIS function to switch from the off state to the on state.

An embodiment of the present disclosure provides a method for controlling an electronic device, which includes the electronic device obtaining the video information of the electronic device through the image sensor. When the video information of the electronic device does not change or changes at a constant rate within the preset period of time, the EIS function of the electronic device can be controlled to be in the off state. When the video information of the electronic device changes at a varying rate within the preset period of time, the EIS function of the electronic device can be controlled to be in the on state. As such, whether the EIS function of the electronic device is turned on or off can be automatically controlled, thereby improving the efficiency of the switching of the EIS function.

Figure 2F:
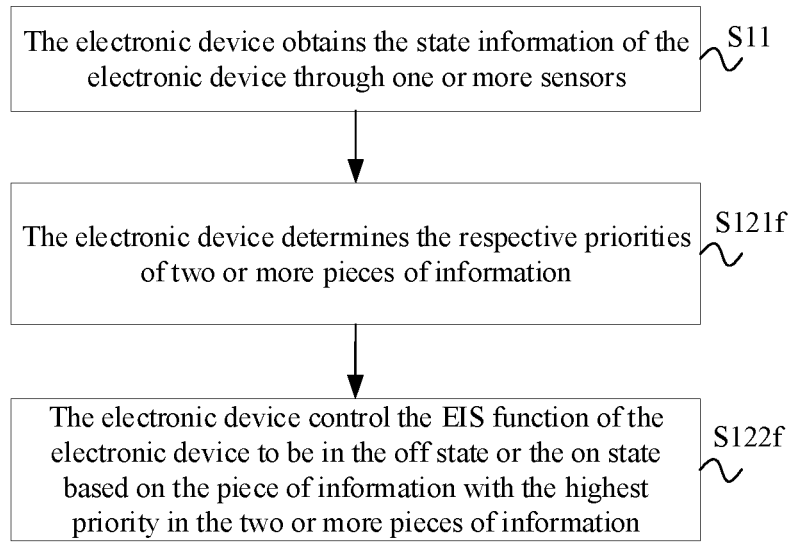
FIG. 2F is a flowchart of a method for controlling an electronic device according to another embodiment of the present disclosure.

FIG. 2F is a flowchart of a method for controlling an electronic device according to another embodiment of the present disclosure. The execution body of the method can be a part of the electronic device, such as the processor of the electronic device, or the entire electronic device. The electronic device can be a motion camera or a sports camera, as long as the electronic device has an imaging function, which is not limited in the embodiments of the present disclosure. In the following, the control method will be described by taking the electronic device as the execution body as an example. As shown in FIG. 2F, when the state information includes two or more of the acceleration information of the electronic device, the height information of the electronic device, the GPS information of the electronic device, and the video information of the electronic device, the EIS function of the electronic device may be controlled to be in the off state or the on state based on the state information, and the process at S12 includes the following processes.

S121f, the electronic device determines the respective priorities of the two or more pieces of information.

S122f, the electronic device controls the EIS function of the electronic device to be in the off state or the on state based on the piece of information with the highest priority in the two or more pieces of information.

For example, when the state information includes the acceleration information of the electronic device, the height information of the electronic device, the GPS information of the electronic device, and the video information of the electronic device, and the acceleration information of the electronic device has the highest priority in the state information, the electronic device may control the EIS function to be in the off state or the on state based on the acceleration information of the electronic device. For details, reference may be made to the description of FIG. 2A or FIG. 2B above.

When the height information of the electronic device has the highest priority in the state information, the electronic device may control the EIS function to be in the off state or the on state based on the height information of the electronic device. For details, reference may be made to the description of FIG. 2C above.

When the GPS information of the electronic device has the highest priority in the state information, the electronic device may control the EIS function to be in the off state or the on state based on the GPS information of the electronic device. For details, reference may be made to the description of FIG. 2D above.

When the video information of the electronic device has the highest priority in the state information, the electronic device may control the EIS function to be in the off state or the on state based on the video information of the electronic device. For details, reference may be made to the description of FIG. 2E above.

An embodiment of the present disclosure provides a method for controlling an electronic device, which includes, when the state information includes two or more of the acceleration information of the electronic device, the height information of the electronic device, the GPS information of the electronic device, or the video information of the electronic device, the electronic device determining the respective priorities of the two or more pieces of information, and controlling the EIS function of the electronic device to be in the off state or the on state based on the piece of information with the highest priority. As such, whether the EIS function of the electronic device is turned on or off can be automatically controlled, thereby improving the efficiency of the switching of the EIS function.

Figure 2G:
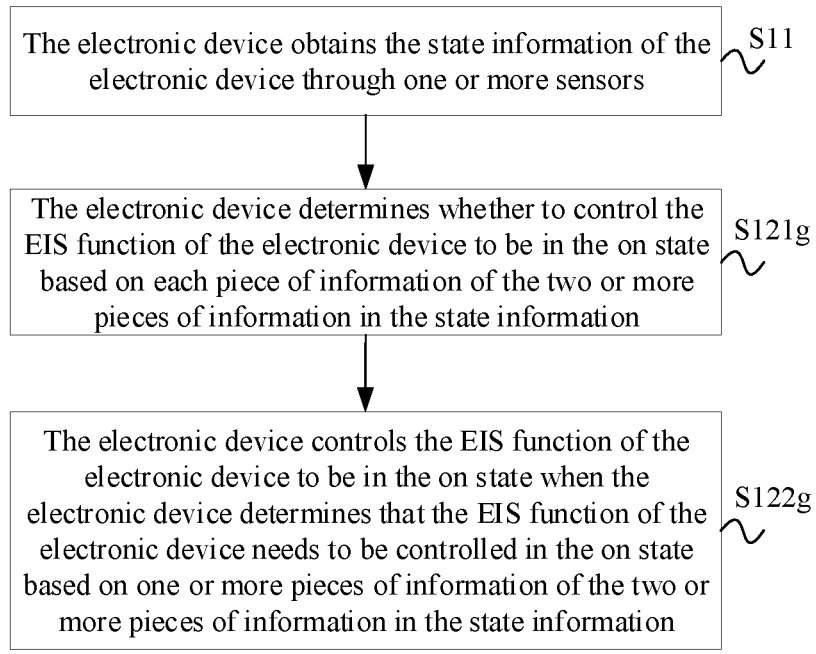
FIG. 2G is a flowchart of a method for controlling an electronic device according to another embodiment of the present disclosure.

FIG. 2G is a flowchart of a method for controlling an electronic device according to another embodiment of the present disclosure. The execution body of the method can be a part of the electronic device, such as the processor of the electronic device, or the entire electronic device. The electronic device can be a motion camera or a sports camera, as long as the electronic device has an imaging function, which is not limited in the embodiments of the present disclosure. In the following, the control method will be described by taking the electronic device as the execution body as an example. As shown in FIG. 2G, when the state information includes two or more of the acceleration information of the electronic device, the height information of the electronic device, the GPS information of the electronic device, and the video information of the electronic device, the EIS function of the electronic device may be controlled to be in the off state or the on state based on the state information, and the process at S12 includes the following processes.

S121g, the electronic device determines whether to control the EIS function of the electronic device to be in the on state based on each piece of information of the two or more pieces of information in the state information.

S122g, the electronic device controls the EIS function of the electronic device to be in the on state when the electronic device determines that the EIS function of the electronic device needs to be controlled in the on state based on one or more pieces of information of the two or more pieces of information in the state information.

For example, when the state information includes the acceleration information of the electronic device, the height information of the electronic device, the GPS information of the electronic device, and the video information of the electronic device, and it is determined that the EIS function needs to be in the on state based on the acceleration information of the electronic device, the EIS function of the electronic device may be controlled to be in the on state. For details, reference may be made to the description of FIG. 2A or FIG. 2B above.

An embodiment of the present disclosure provides a method for controlling an electronic device, which includes, when the state information includes two or more of the acceleration information of the electronic device, the height information of the electronic device, the GPS information of the electronic device, or the video information of the electronic device, the electronic device determining whether to control the EIS function of the electronic device to be in the on state based on each piece of information of the two or more pieces of information in the state information. When the electronic device determines that the EIS function of the electronic device needs to be controlled in the on state based on one or more pieces of information of the two or more pieces of information in the state information, the EIS function of the electronic device can be controlled to be in the on state. As such, whether the EIS function of the electronic device is turned on or off can be automatically controlled, thereby improving the efficiency of the switching of the EIS function.

Figure 3:
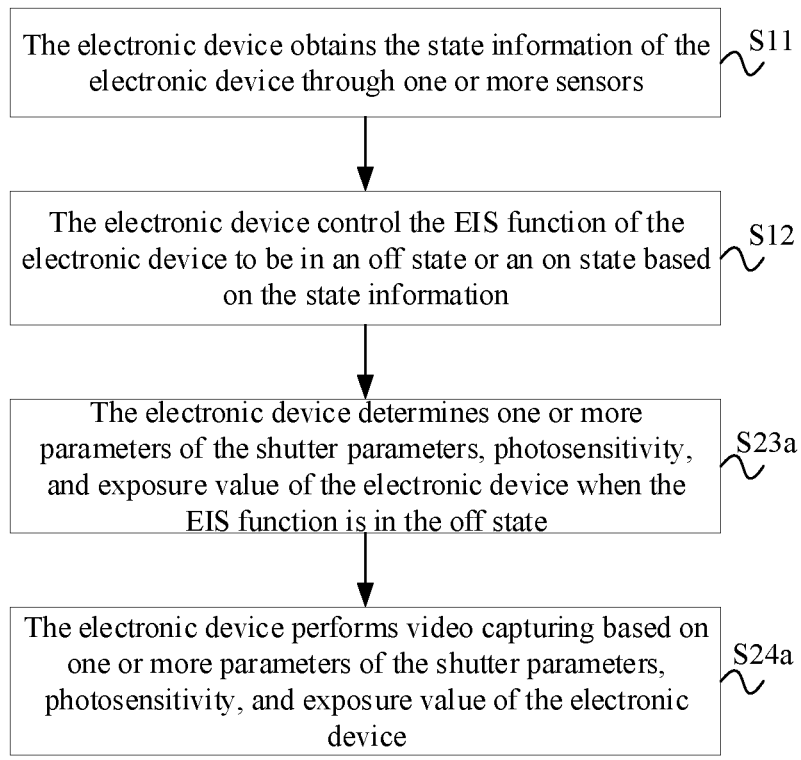
FIG. 3 is a flowchart of a method for controlling an electronic device according to another embodiment of the present disclosure.

FIG. 3 is a flowchart of a method for controlling an electronic device according to an embodiment of the present disclosure, which can be based on any one of the embodiments described above in connection with, e.g., FIG. 1 to FIG. 2G. The execution body of the method can be a part of the electronic device, such as the processor of the electronic device, or the entire electronic device. The electronic device can be a motion camera or a sports camera, as long as the electronic device has an imaging function, which is not limited in the embodiments of the present disclosure. In the following, the control method will be described by taking the electronic device as the execution body as an example. As shown in FIG. 3, after the process at S12, the method further includes the following processes.

S23a, the electronic device determines one or more parameters of the shutter parameters, photosensitivity, and exposure value of the electronic device when the EIS function is in the off state.

S24a, the electronic device performs video capturing based on one or more parameters of the shutter parameters, photosensitivity, and exposure value of the electronic device.

More specifically, when the EIS function is in the off state and the on state, the corresponding shutter parameters may be the same or different. Similarly, when the EIS function is in the off state and the on state, the corresponding photosensitivity parameters may be the same or different; and when the EIS function is in the off state and the on state, the corresponding exposure values may be the same or different.

In some embodiments, the one or more parameters of the shutter parameters, photosensitivity, and exposure value of the electronic device may be pre-configured.

It should be noted that that the parameters of the electronic device are not limited to the shutter parameters, photosensitivity, and exposure value described above.

In some embodiments, the electronic device may perform video capturing based on one or more parameters of the shutter parameters, photosensitivity, and exposure value of the electronic device. That is, the electronic device may perform parameter adjustment based on the one or more parameters, and then perform video capturing after the adjustment.

An embodiment of the present disclosure provides a method for controlling an electronic device, which includes determining one or more parameters of the shutter parameters, photosensitivity, and exposure value of the electronic device when the EIS function is in the off state. The electronic device can perform video capturing based on the one or more parameters of the shutter parameters, photosensitivity, and exposure value of the electronic device. That is, the electronic device can have parameters matching the on state and off state of the EIS function, and based on this, the video captured by the electronic device can have better effects.

Figure 4:
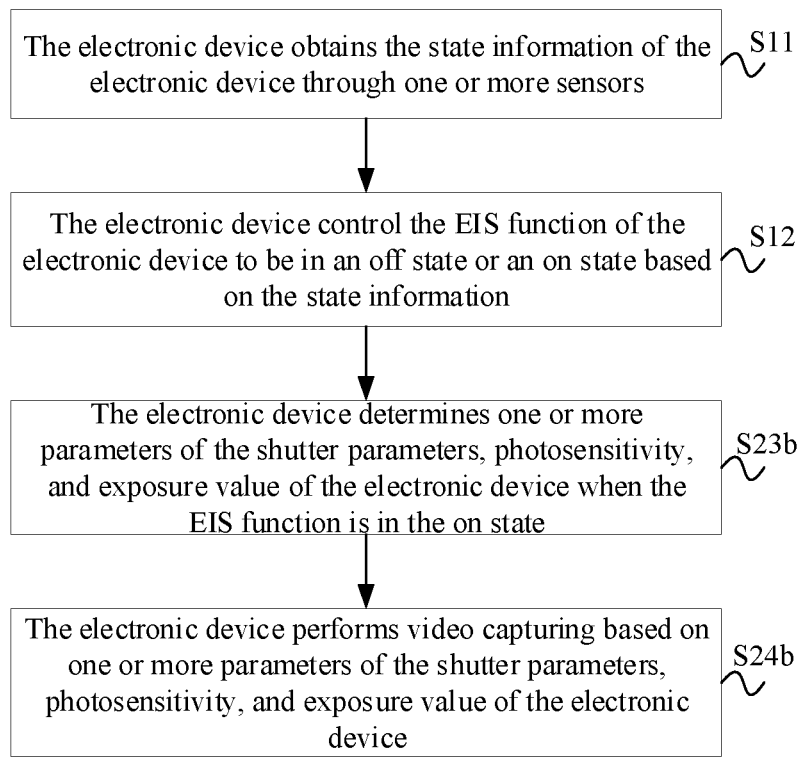
FIG. 4 is a flowchart of a method for controlling an electronic device according to another embodiment of the present disclosure.

FIG. 4 is a flowchart of a method for controlling an electronic device according to another embodiment of the present disclosure, which can be based on any one of the embodiments described above in connection with, e.g., FIG. 1 to FIG. 2G. The execution body of the method can be a part of the electronic device, such as the processor of the electronic device, or the entire electronic device. The electronic device can be a motion camera or a sports camera, as long as the electronic device has an imaging function, which is not limited in the embodiments of the present disclosure. In the following, the control method will be described by taking the electronic device as the execution body as an example. As shown in FIG. 4, after the process at S12, the method further includes the following processes.

S23b, the electronic device determines one or more parameters of the shutter parameters, photosensitivity, and exposure value of the electronic device when the EIS function is in the on state.

S24b, the electronic device performs video capturing based on one or more parameters of the shutter parameters, photosensitivity, and exposure value of the electronic device.

More specifically, when the EIS function is in the off state and the on state, the corresponding shutter parameters may be the same or different. Similarly, when the EIS function is in the off state and the on state, the corresponding photosensitivity parameters may be the same or different; and when the EIS function is in the off state and the on state, the corresponding exposure values may be the same or different.

In some embodiments, the one or more parameters of the shutter parameters, photosensitivity, and exposure value of the electronic device may be pre-configured.

It should be noted that that the parameters of the electronic device are not limited to the shutter parameters, photosensitivity, and exposure value described above.

In some embodiments, the electronic device may perform video capturing based on one or more parameters of the shutter parameters, photosensitivity, and exposure value of the electronic device. That is, the electronic device may perform parameter adjustment based on the one or more parameters, and then perform video capturing after the adjustment.

An embodiment of the present disclosure provides a method for controlling an electronic device, which includes determining one or more parameters of the shutter parameters, photosensitivity, and exposure value of the electronic device when the EIS function is in the on state. The electronic device can perform video capturing based on the one or more parameters of the shutter parameters, photosensitivity, and exposure value of the electronic device. That is, the electronic device can have parameters matching the on state and off state of the EIS function, and based on this, the video captured by the electronic device can have better effects.

Figure 5:
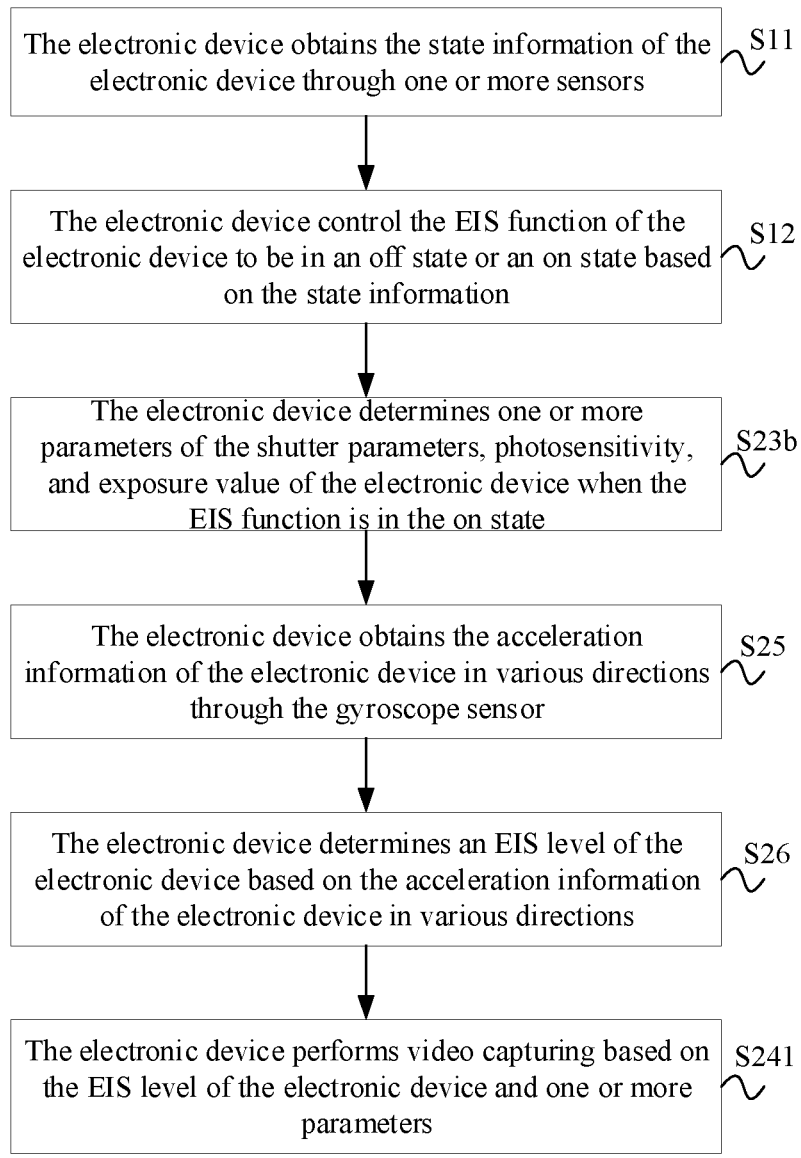
FIG. 5 is a flowchart of a method for controlling an electronic device according to another embodiment of the present disclosure.

FIG. 5 is a flowchart of a method for controlling an electronic device according to another embodiment of the present disclosure, which can be based on any one of the embodiments described above in connection with, e.g., FIG. 4. The execution body of the method can be a part of the electronic device, such as the processor of the electronic device, or the entire electronic device. The electronic device can be a motion camera or a sports camera, as long as the electronic device has an imaging function, which is not limited in the embodiments of the present disclosure. In the following, the control method will be described by taking the electronic device as the execution body as an example. As shown in FIG. 5, before the process at S24b, the method further includes the following processes.

S25, the electronic device obtains the acceleration information of the electronic device in various directions through the gyroscope sensor.

S26, the electronic device determines an EIS level of the electronic device based on the acceleration information of the electronic device in various directions.

Correspondingly, in the example shown in FIG. 5, the process at S24b includes the following process.

S241, the electronic device performs video capturing based on the EIS level of the electronic device and one or more parameters.

For the process at S25, various directions may include one or more of a first direction, a second direction, and a third direction. In some embodiments, the first direction may be a roll direction, the second direction may be a pitch direction, and the third direction may be a yaw direction.

For the process at S26, when the acceleration information of the electronic device in the first direction is greater than a first preset threshold and less than or equal to a second preset threshold, the acceleration information of the electronic device in the second direction is greater than a third preset threshold and less than or equal to a fourth preset threshold, and the acceleration information of the electronic device in the third direction is greater than a fifth preset threshold and less than or equal to a sixth preset threshold, then the EIS level of the electronic device may be determined to be a first EIS level.

When the acceleration information of the electronic device in the first direction is greater than the second preset threshold and less than or equal to a seventh preset threshold, the acceleration information of the electronic device in the second direction is greater than the fourth preset threshold and less than or equal to an eighth preset threshold, and the acceleration information of the electronic device in the third direction is greater than the sixth preset threshold and less than or equal to a ninth preset threshold, then the EIS level of the electronic device may be determined to be a second EIS level.

When the acceleration information of the electronic device in the first direction is greater than the seventh preset threshold, the acceleration information of the electronic device in the second direction is greater than the eighth preset threshold, and the acceleration information of the electronic device in the third direction is greater than the ninth preset threshold, then the EIS level of the electronic device may be determined to be a third EIS level.

In some embodiments, the first preset threshold may be less than the second preset threshold, the second preset threshold may be less than the seventh preset threshold, the third preset threshold may be less than the fourth preset threshold, the fourth preset threshold may be less than the eighth preset threshold, the fifth preset threshold may be less than the sixth preset threshold, and the sixth preset threshold may be less than the ninth preset threshold.

In some embodiments, the first preset threshold, second preset threshold, third preset threshold, fourth preset threshold, fifth preset threshold, sixth preset threshold, seventh preset threshold, eighth preset threshold, and ninth preset threshold may be set based on actual situation.

In some embodiments, the third EIS level may be higher than the second EIS level, and the second EIS level may be higher than the first EIS level. The higher the EIS level, the more suitable it may be for the varying-speed scenes.

It should be noted that more ELS levels may be set in the embodiments of the present disclosure, which is not limited in the embodiments of the present disclosure.

The process at S241 will be described in detail below.

The electronic device may adjust the parameters based on one or more parameters, adjust the EIS level to the EIS level determined based on the process at S26, and perform video capturing after the adjustment.

In some embodiments, after the electronic device obtains the captured video, an interpolation algorithm can be used for each frame of the image, which can improve the resolution of the video.

An embodiment of the present disclosure provides a method for controlling an electronic device, which includes the electronic device obtaining the acceleration information of the electronic device in various directions through the gyroscope sensor. The electronic device can determine the EIS level of the electronic device based on the acceleration information of the electronic device in various directions. The electronic device can perform video capturing based on the EIS level of the electronic device and one or more parameters. Since the electronic device can determine the EIS level in time and perform video capturing based on the EIS level, based on this, the video captured by the electronic device can have better effects.

Figure 6:
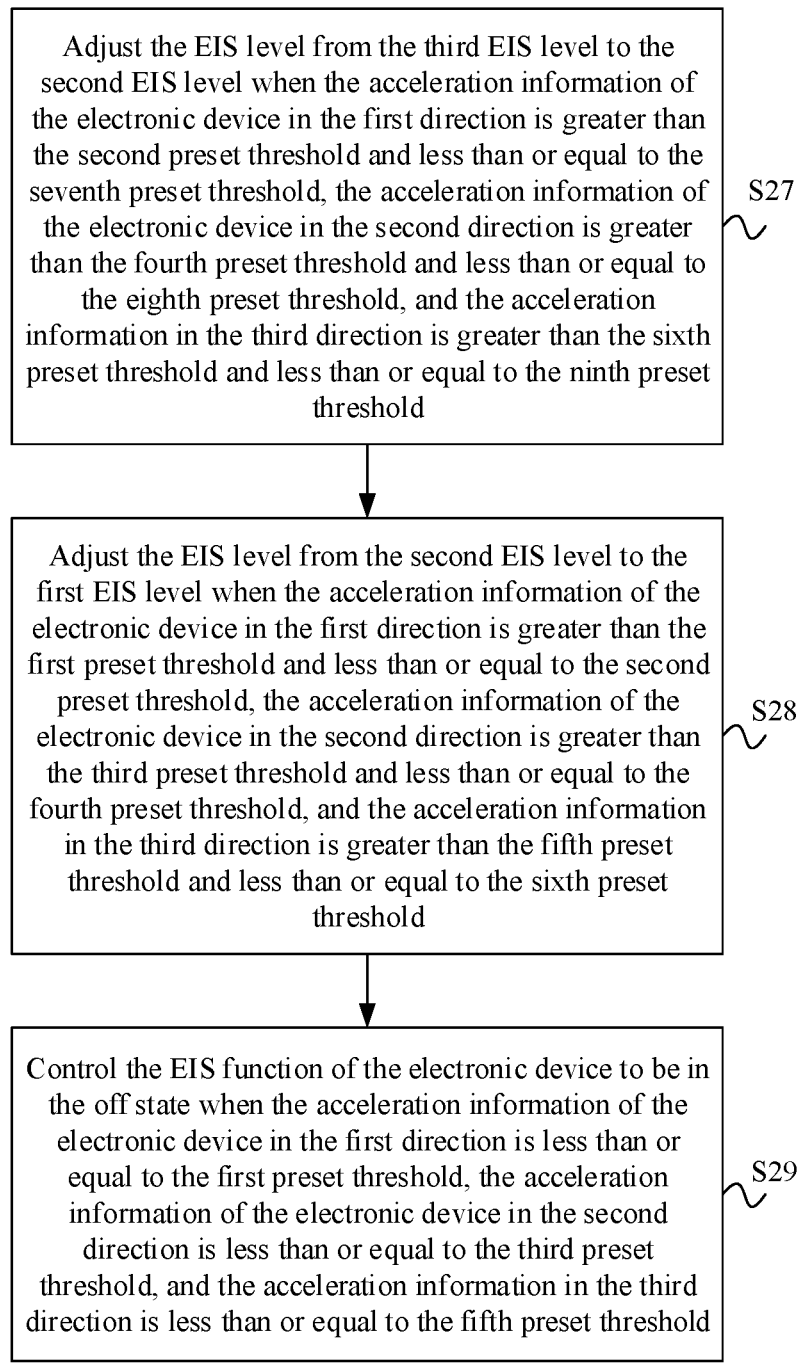
FIG. 6 is a flowchart of a method for controlling an electronic device according to another embodiment of the present disclosure.

FIG. 6 is a flowchart of a method for controlling an electronic device according to another embodiment of the present disclosure, which can be based on any one of the embodiments described above in connection with, e.g., FIG. 5. The execution body of the method can be a part of the electronic device, such as the processor of the electronic device, or the entire electronic device. The electronic device can be a motion camera or a sports camera, as long as the electronic device has an imaging function, which is not limited in the embodiments of the present disclosure. In the following, the control method will be described by taking the electronic device as the execution body as an example. As shown in FIG. 6, after determining the EIS level of the electronic device is the third EIS level, the method further includes the following processes.

S27, when the acceleration information of the electronic device in the first direction is greater than the second preset threshold and less than or equal to the seventh preset threshold, the acceleration information of the electronic device in the second direction is greater than the fourth preset threshold and less than or equal to the eighth preset threshold, and the acceleration information in the third direction is greater than the sixth preset threshold and less than or equal to the ninth preset threshold, the EIS level is adjusted from the third EIS level to the second EIS level.

S28, when the acceleration information of the electronic device in the first direction is greater than the first preset threshold and less than or equal to the second preset threshold, the acceleration information of the electronic device in the second direction is greater than the third preset threshold and less than or equal to the fourth preset threshold, and the acceleration information in the third direction is greater than the fifth preset threshold and less than or equal to the sixth preset threshold, the EIS level is adjusted from the second EIS level to the first EIS level.

S29, when the acceleration information of the electronic device in the first direction is less than or equal to the first preset threshold, the acceleration information of the electronic device in the second direction is less than or equal to the third preset threshold, and the acceleration information in the third direction is less than or equal to the fifth preset threshold, the EIS function of the electronic device is controlled to be in the off state.

It should be noted that this embodiment of the present disclosure is directly to a situation where an electronic device gradually transitions from a varying-speed scene to a constant-speed scene or a static scene. Based on this, the EIS level may change to the second EIS level from the third EIS level, then change to the first EIS level from the second EIS level, and finally change to the EIS function off state from the first EIS level.

In some embodiments, after determining the EIS level of the electronic device is in the third EIS level, the EIS level may also be adjusted in the following manner.

When the acceleration information of the electronic device in the first direction is greater than the second preset threshold and less than or equal to the seventh preset threshold, the acceleration information of the electronic device in the second direction is greater than the fourth preset threshold and less than or equal to the eighth preset threshold, and the acceleration information of the electronic device in the third direction is greater than sixth preset threshold and less than or equal to the ninth preset threshold, the EIS level may be adjusted from the third EIS level to the second EIS level.

When the acceleration information of the electronic device in the first direction is greater than the second preset threshold and less than or equal to the seventh preset threshold, the acceleration information of the electronic device in the second direction is greater than the fourth preset threshold and less than or equal to the eighth preset threshold, and the acceleration information in the third direction is greater than the sixth preset threshold and less than or equal to the ninth preset threshold, the EIS level may be adjusted from the third EIS level to the first EIS level.

When the acceleration information of the electronic device in the first direction is less than or equal to the first preset threshold, the acceleration information of the electronic device in the second direction is less than or equal to the third preset threshold, and the acceleration information in the third direction is less than or equal to the fifth preset threshold, the EIS function may be adjusted from the third EIS level to the EIS function off state.

An embodiment of the present disclosure provides a method for controlling an electronic device, in which the electronic device can obtain the acceleration information in various directions in real time, and adjust the EIS level based on the relationship between the acceleration information and the corresponding preset thresholds, such that the reliability of the electronic device can be improved.

Figure 7:
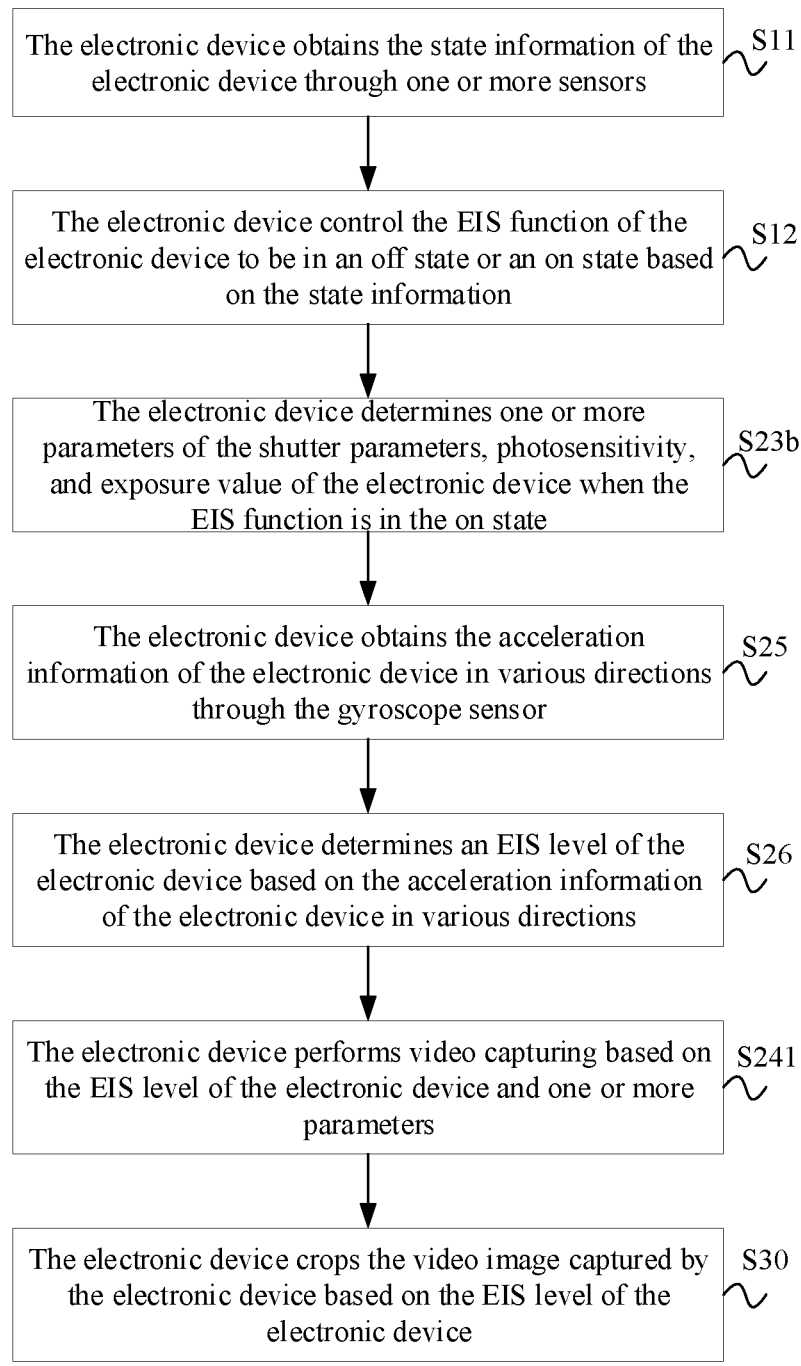
FIG. 7 is a flowchart of a method for controlling an electronic device according to another embodiment of the present disclosure.

FIG. 7 is a flowchart of a method for controlling an electronic device according to another embodiment of the present disclosure, which can be based on any one of the embodiments described above in connection with, e.g., FIG. 5 and FIG. 6. The execution body of the method can be a part of the electronic device, such as the processor of the electronic device, or the entire electronic device. The electronic device can be a motion camera or a sports camera, as long as the electronic device has an imaging function, which is not limited in the embodiments of the present disclosure. In the following, the control method will be described by taking the electronic device as the execution body as an example. As shown in FIG. 7, after the process at S241, the method further includes the following process.

S30, the electronic device crops the video image captured by the electronic device based on the EIS level of the electronic device.

In some embodiments, the electronic device may pre-establish a correspondence between each EIS level and each cropping ratio as shown in Table 1.

TABLE 1

| EIS Level | Cropping Ratio |
| --- | --- |
| First EIS Level | First Cropping Ratio |
| Second EIS Level | Second Cropping Ratio |
| Third EIS Level | Third Cropping Ratio |

The electronic device may determine the cropping ratio corresponding to the current EIS level based on the current EIS level of the electronic device and the correspondence between each EIS level and each cropping ratio; and crop the video image based on the cropping ratio.

It should be noted that the method of cropping the video image based on the cropping ratio may be a conventional method, which is not limited in the embodiments of the present disclosure.

An embodiment of the present disclosure provides a method for controlling an electronic device, in which the electronic device can crop the video image captured by the electronic device based on the EIS level of the electronic device, instead of cropping the video image based on a fixed cropping ratio, thereby improving the display effect of the video image.

Figure 8:
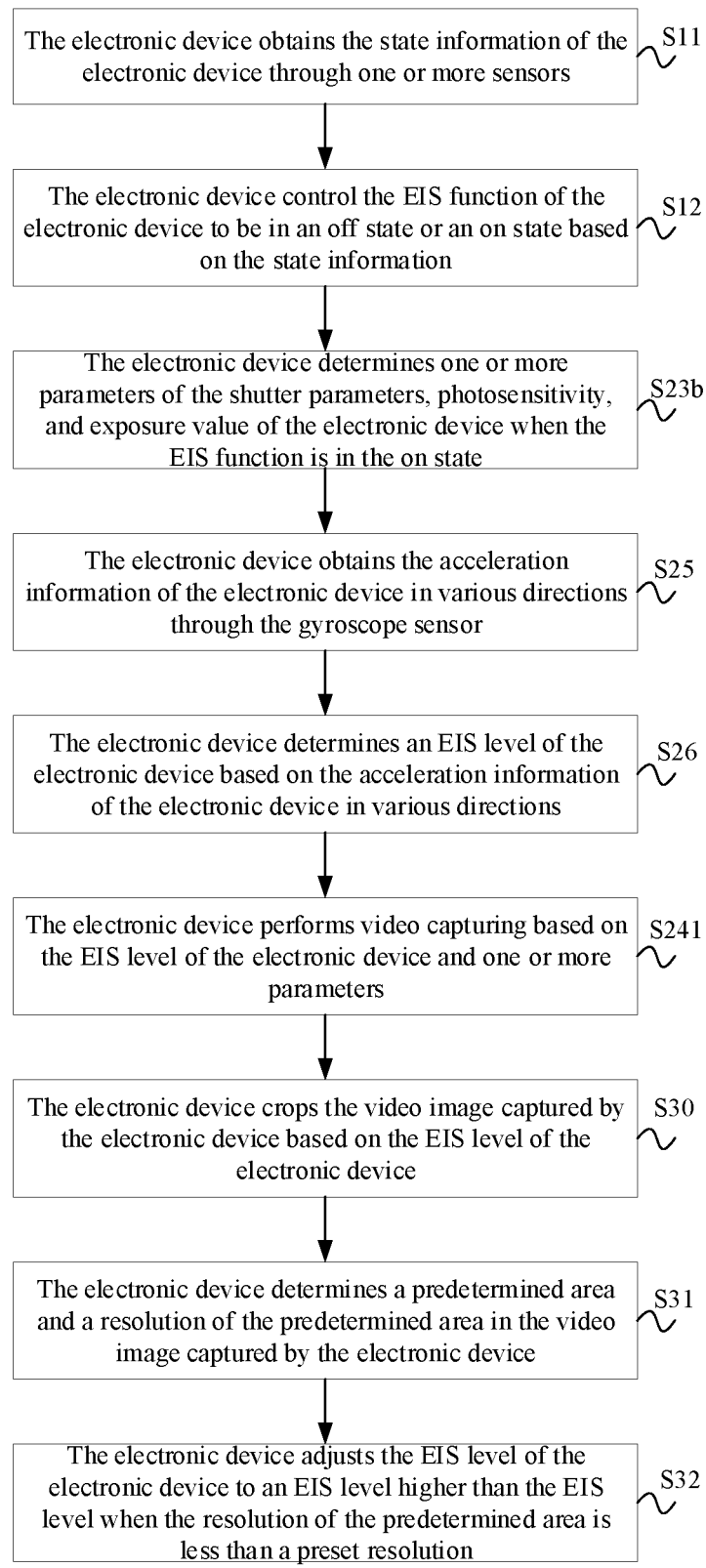
FIG. 8 is a flowchart of a method for controlling an electronic device according to another embodiment of the present disclosure.

FIG. 8 is a flowchart of a method for controlling an electronic device according to another embodiment of the present disclosure, which can be based on any one of the embodiments described above in connection with, e.g., FIG. 7. The execution body of the method can be a part of the electronic device, such as the processor of the electronic device, or the entire electronic device. The electronic device can be a motion camera or a sports camera, as long as the electronic device has an imaging function, which is not limited in the embodiments of the present disclosure. In the following, the control method will be described by taking the electronic device as the execution body as an example. As shown in FIG. 8, after the process at S30, the method further includes the following processes.

S31, the electronic device determines a preset area and a resolution of the preset area in the video image captured by the electronic device.

S32, the electronic device adjusts the EIS level of the electronic device to an EIS level higher than the EIS level when the resolution of the preset area is less than a preset resolution.

In some embodiments, the processes at S31 and S32 are equivalent to the EIS level verification process.

Figure 9:
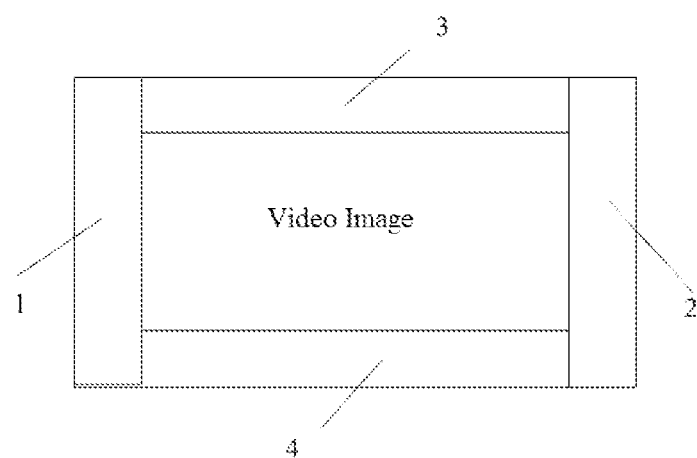
FIG. 9 is a schematic diagram showing an edge area according to an embodiment of the present disclosure.

In some embodiments, the preset area may be an edge area in the video image. For example, FIG. 9 is a schematic diagram showing an edge area according to an embodiment of the present disclosure. As shown in FIG. 9, the shape of the video image is a rectangle, and the edge area includes at least one of a left edge area 1, a right edge area 2, an upper edge area 3, and a lower edge area 4 in the video image.

In some embodiments, the preset resolution can be set based on the actual situation, which is not limited in the embodiments of the present disclosure.

Adjusting the EIS level of the electronic device to an EIS level higher than the EIS level may include adjusting the current EIS level to the second EIS level or the third EIS level when the current EIS level of the electronic device is the first EIS level. When the current EIS level of the electronic device is the second EIS level, the current EIS level may be adjusted to the third EIS level. Of course, if the current EIS level of the electronic device is the third EIS level, since the third EIS level is the highest EIS level, the electronic device does not need to perform the EIS level adjustment.

An embodiment of the present disclosure provides a method for controlling an electronic device, in which the electronic device can determine the preset area and the resolution of the preset area in the video image captured by the electronic device. When the resolution of the preset area is less than the preset resolution, the EIS level of the electronic device can be adjusted to an EIS level higher than the EIS level. As such, the calibration of the EIS level can be achieved. Based on this, the video image obtained by the electronic device during video capturing based on the EIS level can be improved, or the display effect of the video image obtained by the electronic device by video cropping based on the EIS level can be improved.

Figure 10:
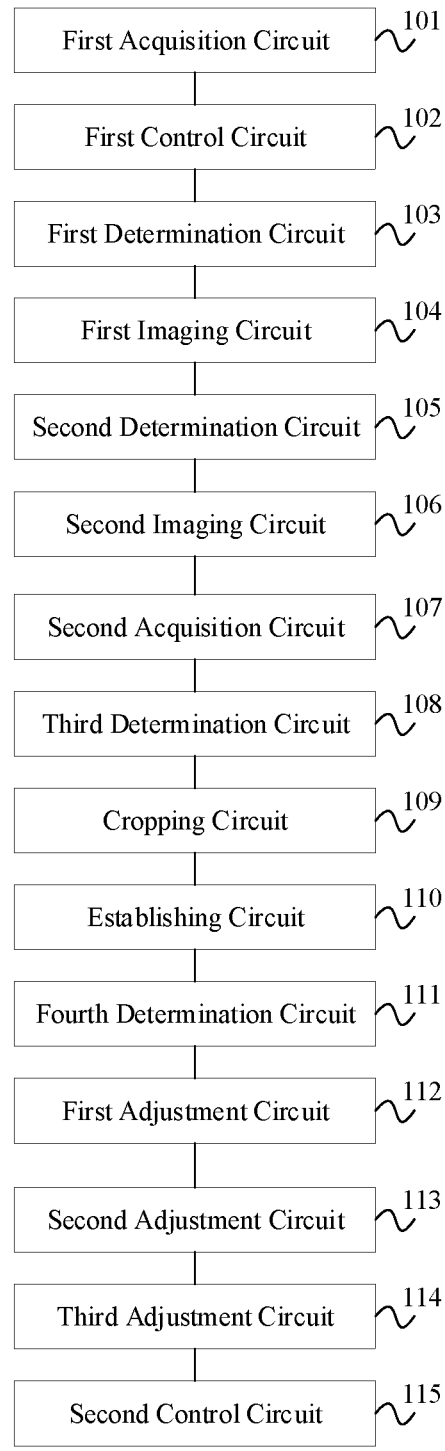
FIG. 10 is a schematic structural diagram of a control device for an electronic device according to an embodiment of the present disclosure.

FIG. 10 is a schematic structural diagram of a control device for an electronic device according to an embodiment of the present disclosure. As shown in FIG. 10, the device includes a first acquisition circuit 101 configured to obtain state information of the electronic device through one or more sensors in the electronic device, and a first control circuit 102 configured to control the EIS function of the electronic device to be in the off state or the on state based on the state information.

In some embodiments, the one or more sensors may include a gyroscope sensor, a barometer sensor, a GPS sensor, or an image sensor. Correspondingly, the state information may include one or more of the acceleration information of the electronic device measured by the gyroscope sensor, the height information of the electronic device sensed by the barometer sensor, the GPS information of the electronic device obtained by the GPS sensor, and the video information of the electronic device obtained by the image sensor.

In some embodiments, when the state information is the acceleration information of the electronic device, the first control circuit 102 may be configured to control the EIS function of the electronic device to be in the off state when the acceleration information of the electronic device is 0; and control the EIS function of the electronic device to be in the on state when the acceleration information of the electronic device is not 0.

In some embodiments, when the state information is the acceleration information of the electronic device, the first control circuit 102 may be configured to control the EIS function of the electronic device to be in the off state when the acceleration information of the electronic device is less than the preset acceleration threshold; and control the EIS function of the electronic device to be in the on state when the acceleration information of the electronic device is greater than or equal to the preset acceleration threshold.

In some embodiments, when the state information is the height information of the electronic device, the first control circuit 102 may be configured to control the EIS function of the electronic device to be in the off state when the height information of the electronic device does not change or changes at a constant speed within the preset period of time; and control the EIS function of the electronic device to be in the on state when the height information of the electronic device changes at a varying speed within the preset period of time.

In some embodiments, when the state information is the GPS information of the electronic device, the first control circuit 102 may be configured to control the EIS function of the electronic device to be in the off state when the GPS information of the electronic device does not change or changes at a constant rate within the preset period of time; and control the EIS function of the electronic device to be in the on state when the GPS information of the electronic device changes at a varying rate within the preset period of time.

In some embodiments, when the state information is the video information of the electronic device, the first control circuit 102 may be configured to control the EIS function of the electronic device to be in the off state when the video information of the electronic device does not change or changes at a constant rate within the preset period of time; and control the EIS function of the electronic device to be in the on state when the video information of the electronic device changes at a varying rate within the preset period of time.

In some embodiments, when the state information includes two or more of the acceleration information of the electronic device, the height information of the electronic device, the GPS information of the electronic device, or the video information of the electronic device, the first control circuit 102 may be configured to determine the respective priorities of the two or more pieces of information; and control the EIS function of the electronic device to be in the off state or the on state based on the piece of information with the highest priority in the two or more pieces of information.

In some embodiments, when the state information includes two or more of the acceleration information of the electronic device, the height information of the electronic device, the GPS information of the electronic device, or the video information of the electronic device, the first control circuit 102 may be configured to determine whether to control the EIS function of the electronic device to be in the on state based on each of the two or more pieces of information; and control the EIS function of the electronic device to be in the on state when it is determined that the EIS function of the electronic device needs to be in the on state based on at least one piece of information in the two or more pieces of information.

In some embodiments, the device further includes a first determination circuit 103 configured to determine one or more of the parameters of the shutter parameters, photosensitivity, and exposure value of the electronic device when the EIS function is in the off state; and a first imaging circuit 104 configured to perform video capturing based on the one or more parameters of the shutter parameters, photosensitivity, and exposure value of the electronic device.

In some embodiments, the device further includes a second determination circuit 105 configured to determine one or more parameters of the shutter parameters, photosensitivity, and exposure value of the electronic device when the EIS function is in the on state; and a second imaging circuit 106 configured to perform video capturing based on the one or more parameters of the shutter parameters, photosensitivity, and exposure value of the electronic device.

In some embodiments, the device further includes a second acquisition circuit 107 configured to obtain acceleration information of the electronic device in various directions through the gyroscope sensor; and a third determination circuit 108 configured to determine the EIS level of the electronic device based on the acceleration information of the electronic device in various directions. Correspondingly, the second imaging circuit 106 may be configured to perform video capturing based on the EIS level of the electronic device at the one or more parameters.

In some embodiments, the device further includes a cropping circuit 109 configured to crop the video image captured by the electronic device based on the EIS level of the electronic device.

In some embodiments, the various directions may include a first direction, a second direction, and a third direction. Correspondingly, the third determination circuit 108 may be configured to determine the EIS level of the electronic device as the first EIS level if the acceleration information of the electronic device in the first direction is greater than a first preset threshold and less than or equal to a second preset threshold, the acceleration information of the electronic device in the second direction is greater than a third preset threshold and less than or equal to a fourth preset threshold, and the acceleration information of the electronic device in the third direction is greater than a fifth preset threshold and less than or equal to a sixth preset threshold; determine the EIS level of the electronic device as the second EIS level if the acceleration information of the electronic device in the first direction is greater than the second preset threshold and less than or equal to a seventh preset threshold, the acceleration information of the electronic device in the second direction is greater than the fourth preset threshold and less than or equal to an eighth preset threshold, and the acceleration information of the electronic device in the third direction is greater than the sixth preset threshold and less than or equal to a ninth preset threshold; and determine the EIS level of the electronic device as the third EIS level if the acceleration information of the electronic device in the first direction is greater than the seventh preset threshold, the acceleration information of the electronic device in the second direction is greater than the eighth preset threshold, and the acceleration information of the electronic device in the third direction is greater than the ninth preset threshold.

In some embodiments, the cropping circuit 109 may be configured to determine the cropping ratio of the video image based on the EIS level of the electronic device; and crop the video image based on the cropping ratio.

In some embodiments, the device further includes an establishing circuit 110 configured to establish the correspondence between each EIS level and each cropping ratio.

In some embodiments, the device further includes a fourth determination circuit 111 configured to determine the preset area and the resolution of the preset area in the video image captured by the electronic device; and a first adjustment circuit 112 configured to adjust the EIS level of the electronic device to an EIS level higher than the EIS level when the resolution of the preset area is less than the preset resolution.

In some embodiments, the preset area may be an edge area in the video image.

In some embodiments, the device further includes a second adjustment circuit 113 configured to adjust the EIS level from the third EIS level to the second EIS level if the acceleration information of the electronic device in the first direction is greater than the second preset threshold and less than or equal to the seventh preset threshold, the acceleration information of the electronic device in the second direction is greater than the fourth preset threshold and less than or equal to the eighth preset threshold, and the acceleration information of the electronic device in the third direction is greater than the sixth preset threshold and less than or equal to the ninth preset threshold.

In some embodiments, the device further includes a third adjustment circuit 114 configured to adjust the EIS level from the second EIS level to the first EIS level if the acceleration information of the electronic device in the first direction is greater than the first preset threshold and less than or equal to the second preset threshold, the acceleration information of the electronic device in the second direction is greater than the third preset threshold and less than or equal to the fourth preset threshold, and the acceleration information of the electronic device in the third direction is greater than the fifth preset threshold and less than or equal to the sixth preset threshold.

In some embodiments, the device further includes a second control circuit 115 configured to control the EIS function of the electronic device to be in the off state if the acceleration information of the electronic device in the first direction is less than or equal to the first preset threshold, the acceleration information of the electronic device in the second direction is less than or equal to the third preset threshold, and the acceleration information of the electronic device in the third direction is less than or equal to the fifth preset threshold.

The electronic device control device provided in this embodiment of the present disclosure can be used to implement the electronic device control method described above, and for its content and effects, reference may be made to the method embodiments above, which is not limited in the embodiments of the present disclosure.

Figure 11:
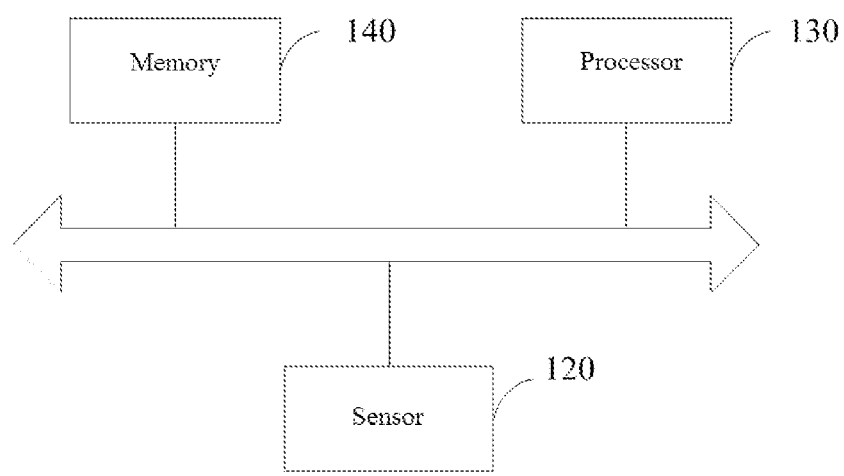
FIG. 11 is a schematic structural diagram of an electronic device according to an embodiment of the present disclosure.

FIG. 11 is a schematic structural diagram of an electronic device according to an embodiment of the present disclosure. As shown in FIG. 11, the electronic device includes one or more sensors 120 (one sensor 120 is shown in FIG. 11 as an example), a processor 130, and a memory 140

In some embodiments, the memory 140 can be configured to store instructions that can be executed by the processor 130.

In some embodiments, the processor 130 may be configured to obtain the state information of the electronic device through one or more sensors, and control the EIS function of the electronic device to be in the off state or the on state based on the state information.

In some embodiments, the one or more sensors may include a gyroscope sensor, a barometer sensor, a GPS sensor, or an image sensor. Correspondingly, the state information may include one or more of the acceleration information of the electronic device measured by the gyroscope sensor, the height information of the electronic device sensed by the barometer sensor, the GPS information of the electronic device obtained by the GPS sensor, and the video information of the electronic device obtained by the image sensor.

In some embodiments, when the state information is the acceleration information of the electronic device, the processor 130 may be configured to control the EIS function of the electronic device to be in the off state when the acceleration information of the electronic device is 0; and control the EIS function of the electronic device to be in the on state when the acceleration information of the electronic device is not 0.

In some embodiments, when the state information is the acceleration information of the electronic device, the processor 130 may be configured to control the EIS function of the electronic device to be in the off state when the acceleration information of the electronic device is less than the preset acceleration threshold; and control the EIS function of the electronic device to be in the on state when the acceleration information of the electronic device is greater than or equal to the preset acceleration threshold.

In some embodiments, when the state information is the height information of the electronic device, the processor 130 may be configured to control the EIS function of the electronic device to be in the off state when the height information of the electronic device does not change or changes at a constant speed within the preset period of time; and control the EIS function of the electronic device to be in the on state when the height information of the electronic device changes at a varying speed within the preset period of time.

In some embodiments, when the state information is the GPS information of the electronic device, the processor 130 may be configured to control the EIS function of the electronic device to be in the off state when the GPS information of the electronic device does not change or changes at a constant rate within the preset period of time; and control the EIS function of the electronic device to be in the on state when the GPS information of the electronic device changes at a varying rate within the preset period of time.

In some embodiments, when the state information is the video information of the electronic device, the processor 130 may be configured to control the EIS function of the electronic device to be in the off state when the video information of the electronic device does not change or changes at a constant rate within the preset period of time; and control the EIS function of the electronic device to be in the on state when the video information of the electronic device changes at a varying rate within the preset period of time.

In some embodiments, when the state information includes two or more of the acceleration information of the electronic device, the height information of the electronic device, the GPS information of the electronic device, or the video information of the electronic device, the processor 130 may be configured to determine the respective priorities of the two or more pieces of information; and control the EIS function of the electronic device to be in the off state or the on state based on the piece of information with the highest priority in the two or more pieces of information.

In some embodiments, when the state information includes two or more of the acceleration information of the electronic device, the height information of the electronic device, the GPS information of the electronic device, or the video information of the electronic device, the processor 130 may be configured to determine whether to control the EIS function of the electronic device to be in the on state based on each of the two or more pieces of information; and control the EIS function of the electronic device to be in the on state when it is determined that the EIS function of the electronic device needs to be in the on state based on at least one piece of information in the two or more pieces of information.

In some embodiments, the processor 130 may be configured to determine one or more of the parameters of the shutter parameters, photosensitivity, and exposure value of the electronic device when the EIS function is in the off state; and perform video capturing based on the one or more parameters of the shutter parameters, photosensitivity, and exposure value of the electronic device.

In some embodiments, the processor 130 may be configured to determine one or more parameters of the shutter parameters, photosensitivity, and exposure value of the electronic device when the EIS function is in the on state; and perform video capturing based on the one or more parameters of the shutter parameters, photosensitivity, and exposure value of the electronic device.

In some embodiments, the processor 130 may be configured to obtain the acceleration information of the electronic device in various directions through a gyroscope sensor, determine the EIS level of the electronic device based on the acceleration information of the electronic device in various directions. Correspondingly, the processor 130 may be configured to perform video capturing based on the EIS level of the electronic device and the one or more parameters.

In some embodiments, the processor 130 may be configured to crop the video image captured by the electronic device based on the EIS level of the electronic device.

In some embodiments, the various directions may include a first direction, a second direction, and a third direction. Correspondingly, the processor 130 may be configured to determine the EIS level of the electronic device as the first EIS level if the acceleration information of the electronic device in the first direction is greater than a first preset threshold and less than or equal to a second preset threshold, the acceleration information of the electronic device in the second direction is greater than a third preset threshold and less than or equal to a fourth preset threshold, and the acceleration information of the electronic device in the third direction is greater than a fifth preset threshold and less than or equal to a sixth preset threshold; determine the EIS level of the electronic device as the second EIS level if the acceleration information of the electronic device in the first direction is greater than the second preset threshold and less than or equal to a seventh preset threshold, the acceleration information of the electronic device in the second direction is greater than the fourth preset threshold and less than or equal to an eighth preset threshold, and the acceleration information of the electronic device in the third direction is greater than the sixth preset threshold and less than or equal to a ninth preset threshold; and determine the EIS level of the electronic device as the third EIS level if the acceleration information of the electronic device in the first direction is greater than the seventh preset threshold, the acceleration information of the electronic device in the second direction is greater than the eighth preset threshold, and the acceleration information of the electronic device in the third direction is greater than the ninth preset threshold.

In some embodiments, the processor 130 may be configured to determine the cropping ratio of the video image based on the EIS level of the electronic device; and crop the video image based on the cropping ratio.

In some embodiments, the processor 130 may be configured to establish the correspondence between each EIS level and each cropping ratio.

In some embodiments, the processor 130 may be configured to determine the preset area and the resolution of the preset area in the video image captured by the electronic device; and adjust the EIS level of the electronic device to an EIS level higher than the EIS level when the resolution of the preset area is less than the preset resolution.

In some embodiments, the preset area may be an edge area in the video image.

In some embodiments, the processor 130 may be configured to adjust the EIS level from the third EIS level to the second EIS level if the acceleration information of the electronic device in the first direction is greater than the second preset threshold and less than or equal to the seventh preset threshold, the acceleration information of the electronic device in the second direction is greater than the fourth preset threshold and less than or sequal to the eighth preset threshold, and the acceleration information of the electronic device in the third direction is greater than the sixth preset threshold and less than or equal to the ninth preset threshold.

In some embodiments, the processor 130 may be configured to adjust the EIS level from the second EIS level to the first EIS level if the acceleration information of the electronic device in the first direction is greater than the first preset threshold and less than or equal to the second preset threshold, the acceleration information of the electronic device in the second direction is greater than the third preset threshold and less than or equal to the fourth preset threshold, and the acceleration information of the electronic device in the third direction is greater than the fifth preset threshold and less than or equal to the sixth preset threshold.

In some embodiments, the processor 130 may be configured to control the EIS function of the electronic device to be in the off state if the acceleration information of the electronic device in the first direction is less than or equal to the first preset threshold, the acceleration information of the electronic device in the second direction is less than or equal to the third preset threshold, and the acceleration information of the electronic device in the third direction is less than or equal to the fifth preset threshold.

The electronic device provided in this embodiment of the present disclosure can be used to implement an electronic device control method consistent with the disclosure, such as one of the example methods described above, and for its content and effects, reference may be made to the method embodiments above, which is not limited in the embodiments of the present disclosure.

An embodiment of the present disclosure provides a storage medium including computer instructions. The computer instructions can be used to implement the electronic device control method described above, and for its content and effects, reference may be made to the method embodiments above, which is not limited in the embodiments of the present disclosure.

An embodiment of the present disclosure provides a computer program product including computer instructions. The computer instructions can be used to implement the electronic device control method described above, and for its content and effects, reference may be made to the method embodiments above, which is not limited in the embodiments of the present disclosure.

Those skilled in the art shall understand that all or parts of the steps in the above exemplifying method for the present disclosure may be achieved by commanding the related hardware with programs, the programs may be stored in a computer-readable storage medium, and the programs comprise one or a combination of the steps in the method embodiments of the present disclosure when running on a computer. In some embodiments, the storage medium may be a magnetic disk, an optical disk, a read-only memory (ROM), or a random access memory (RAM).

Finally, it should be noted that the foregoing embodiments are merely intended for describing the technical solutions of the present disclosure, but not to limit the present disclosure. Although the present disclosure is described in detail with reference to the foregoing embodiments, it should be understood by those of ordinary skill in the art that the technical solutions described in the foregoing embodiments may still be modified, or a part or all of the technical features may be equivalently replaced without departing from the spirit and scope of the present disclosure. As a result, these modifications or replacements do not make the essence of the corresponding technical solutions depart from the scope of the technical solutions of the present disclosure.

What is claimed is:

1. A control device comprising:
a processor; and
a memory storing instructions that, when executed by the processor, cause the processor to:
obtain state information of an electronic device through one or more sensors of the electronic device, the one or more sensors including one or more of a gyroscope sensor, a barometer sensor, a global positioning system (GPS) sensor, and an image sensor, and the state information including two or more pieces of information of an acceleration of the electronic device measured by the gyroscope sensor, a height of the electronic device sensed by the barometer sensor, GPS information of the electronic device obtained by the GPS sensor, and video information of the electronic device obtained by the image sensor;
determine respective priorities of the two or more pieces of information of the state information; and
control an electronic image stabilization (EIS) function of the electronic device to be in an off state or an on state based on the piece of information with a highest priority among the two or more pieces of information.

2. The device of claim 1, wherein:
the state information includes the acceleration of the electronic device; and
the instructions further cause the processor to:
control the EIS function of the electronic device to be in the off state in response to the acceleration of the electronic device being 0; or
control the EIS function of the electronic device to be in the on state in response to the acceleration of the electronic device being not 0.

3. The device of claim 1, wherein:
the state information includes the acceleration of the electronic device; and
the instructions further cause the processor to:
control the EIS function of the electronic device to be in the off state in response to the acceleration of the electronic device being less than an acceleration threshold; or
control the EIS function of the electronic device to be in the on state in response to the acceleration of the electronic device being greater than or equal to the acceleration threshold.

4. The device of claim 1, wherein:
the state information includes the height of the electronic device; and
the instructions further cause the processor to:
control the EIS function of the electronic device to be in the off state in response to the height of the electronic device not changing or changing at a constant speed within a period of time; or
control the EIS function of the electronic device to be in the on state in response to the height information of the electronic device changing at a varying speed within the period of time.

5. The device of claim 1, wherein:
the state information includes the GPS information of the electronic device; and
the instructions further cause the processor to:
control the EIS function of the electronic device to be in the off state in response to the GPS information of the electronic device not changing or changing at a constant rate within a period of time; or
control the EIS function of the electronic device to be in the on state in response to the GPS information of the electronic device changing at a varying rate within the preset period of time.

6. The device of claim 1, wherein:
the state information includes the video information of the electronic device; and
the instructions further cause the processor to:
control the EIS function of the electronic device to be in the off state in response to the video information of the electronic device not changing or changing at a constant rate within a period of time; or
control the EIS function of the electronic device to be in the on state in response to the video information of the electronic device changing at a varying rate within the period of time.

7. The device of claim 1, wherein the instructions further cause the processor to:
determine whether to control the EIS function of the electronic device to be in the on state based on each of the two or more pieces of information; and
control the EIS function of the electronic device to be in the on state in response to determining that the EIS function of the electronic device needs to be in the on state based on one or more pieces of information of the two or more pieces of information.

8. The device of claim 1, wherein the instructions further cause the processor to:

determine one or more parameters of a shutter parameter, a photosensitivity, and an exposure value of the electronic device when the EIS function is in the off state; and perform video capturing based on the one or more parameters.

9. The device of claim 1, wherein the instructions further cause the processor to:

determine one or more parameters of a shutter parameter, a photosensitivity, and an exposure value of the electronic device when the EIS function is in the on state; and perform video capturing based on the one or more parameters.

10. The device of claim 9, wherein the instructions further cause the processor to:

obtain acceleration information of the electronic device in various directions through the gyroscope sensor;

determine an EIS level of the electronic device based on the acceleration information; and perform the video capturing based on the EIS level and the one or more parameters.

11. The device of claim 10, wherein the instructions further cause the processor to:

crop a video image captured by the electronic device based on the EIS level.

12. The device of claim 11, wherein the instructions further cause the processor to:

determine a cropping ratio of the video image based on the EIS level; and crop the video image based on the cropping ratio.

13. The device of claim 12, wherein the instructions further cause the processor to:

establish a correspondence between each EIS level and each cropping ratio.

14. The device of claim 11, wherein the instructions further cause the processor to:

determine a preset area in the video image and a resolution of the preset area; and increase the EIS level in response to the resolution of the preset area being less than a preset resolution.

15. The device of claim 14, wherein:

the preset area includes an edge area in the video image.

16. The device of claim 10, wherein:

the various directions include a first direction, a second direction, and a direction; and the instructions further cause the processor to:

determine the EIS level of the electronic device to be a first EIS level in response to an acceleration of the electronic device in the first direction being greater than a first preset threshold and less than or equal to a second preset threshold, an acceleration of the electronic device in the second direction being greater than a third preset threshold and less than or equal to a fourth preset threshold, and an acceleration information of the electronic device in the third direction being greater than a fifth preset threshold and less than or equal to a sixth preset threshold;

determine the EIS level of the electronic device to be a second EIS level in response to the acceleration of the electronic device in the first direction being greater than the second preset threshold and less than or equal to a seventh preset threshold, the acceleration of the electronic device in the second direction being greater than the fourth preset threshold and less than or equal to an eighth preset threshold, and the acceleration of the electronic device in the third direction being greater than the sixth preset threshold and less than or equal to a ninth preset threshold; and determine the EIS level of the electronic device to be a third EIS level in response to the acceleration of the electronic device in the first direction being greater than the seventh preset threshold, the acceleration of the electronic device in the second direction being greater than the eighth preset threshold, and the acceleration of the electronic device in the third direction being greater than the ninth preset threshold.

17. An electronic device comprising:

one or more sensors including one or more of a gyroscope sensor, a barometer sensor, a global positioning system (GPS) sensor, and an image sensor;

a processor; and a memory storing instructions that, when being executed by the processor, cause the processor to:

obtain state information of the electronic device through the one or more sensors, the state information including two or more pieces of information of an acceleration of the electronic device measured by the gyroscope sensor, a height of the electronic device sensed by the barometer sensor, GPS information of the electronic device obtained by the GPS sensor, and video information of the electronic device obtained by the image sensor;

determine respective priorities of the two or more pieces of information of the state information; and control an electronic image stabilization (EIS) function of the electronic device to be in an off state or an on state based on the piece of information with a highest priority among the two or more pieces of information.

18. A control method comprising:

obtaining state information of an electronic device through one or more sensors of the electronic device, the one or more sensors including one or more of a gyroscope sensor, a barometer sensor, a global positioning system (GPS) sensor, and an image sensor, and the state information including two or more pieces of information of an acceleration of the electronic device measured by the gyroscope sensor, a height of the electronic device sensed by the barometer sensor, GPS information of the electronic device obtained by the GPS sensor, and video information of the electronic device obtained by the image sensor;

determining respective priorities of the two or more pieces of information of the state information; and controlling an electronic image stabilization (EIS) function of the electronic device to be in an off state or an on state based on the piece of information with a highest priority among the two or more pieces of information.

* * * * *